United States Patent [19]
Cottingham et al.

[11] Patent Number: 5,794,837
[45] Date of Patent: Aug. 18, 1998

[54] DIRECTIONAL FLOW CONTROL DEVICE FOR A WAVE SOLDERING APPARATUS

[75] Inventors: Steven William Cottingham, Kokomo; Frank Clyde Spaulding, Sharpsville; Maxwell Geoffrey Davies, Noblesville; Stanley James Pugh, Kokomo; Robert Arnold Crothers, Noblesville, all of Ind.

[73] Assignee: Delco Electronics Corporation, Kokomo, Ind.

[21] Appl. No.: 756,128

[22] Filed: Nov. 25, 1996

[51] Int. Cl.$^6$ ............................................. B23K 3/06
[52] U.S. Cl. ............................ 228/37; 118/410; 222/606
[58] Field of Search ............................ 228/37, 260, 180.1, 228/56.1; 118/410, 429; 222/594, 606

[56] References Cited

U.S. PATENT DOCUMENTS

| | | | |
|---|---|---|---|
| 3,990,621 | 11/1976 | Boynton et al. | 228/257 |
| 4,208,002 | 6/1980 | Comerford et al. | 228/37 |
| 4,447,001 | 5/1984 | Allen et al. | 228/37 |
| 4,600,137 | 7/1986 | Comerford | 228/180.1 |

*Primary Examiner*—Samuel M. Heinrich
*Attorney, Agent, or Firm*—Jimmy L. Funke

[57] ABSTRACT

A flow control device for a solder wave apparatus that includes an outlet or nozzle from which molten solder flows in an upward direction to contact the lower surface of a target, such as a circuit board. The flow control device provides a screen and baffle that control the flow pattern of molten solder to the nozzle so as to result in a near-parallel solder wave above the nozzle. The screen includes a pair of spaced-apart parallel panels that are disposed upstream of the nozzle. Each of the panels has apertures through which the molten solder flows before entering the nozzle. The apertures of the panels are offset from each other, such that none of the apertures are coaxial but instead overlap each other when superimposed. The baffle is disposed further upstream of the screen, and includes a number of fins disposed substantially perpendicular to the panels. The fins are arranged such that their lengths become progressively shorter in a direction away from the center of the baffle.

20 Claims, 1 Drawing Sheet

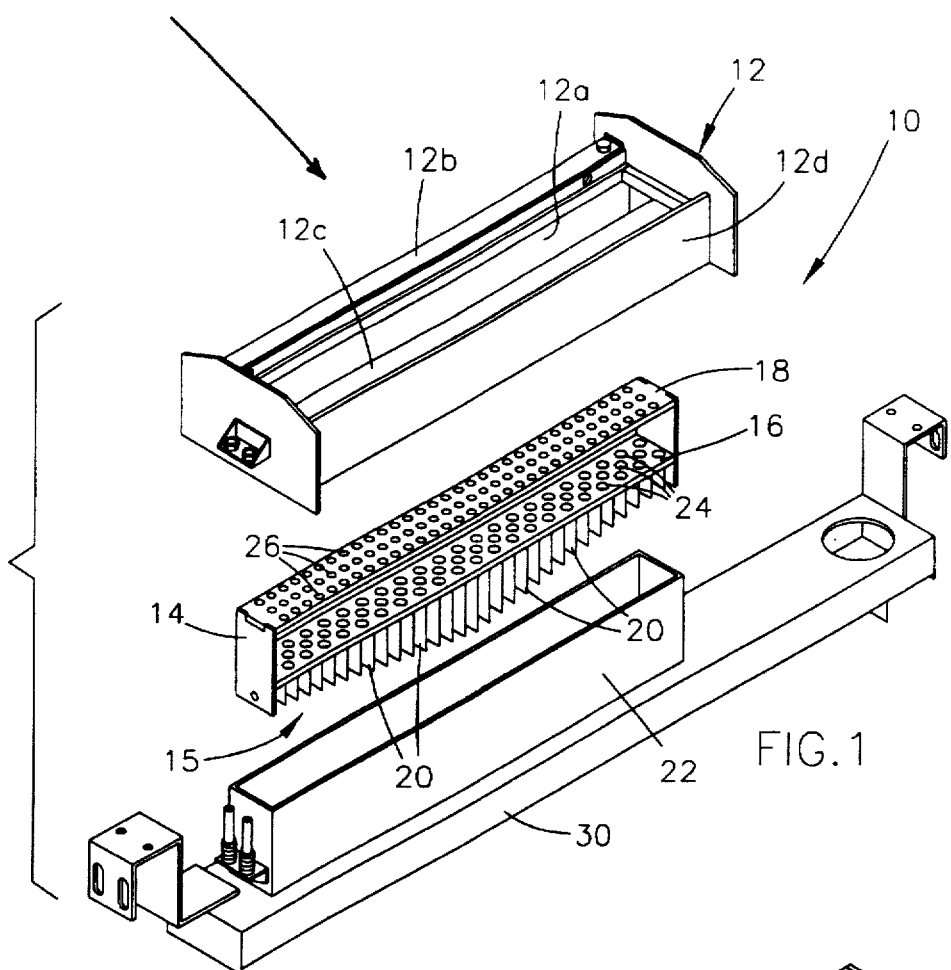
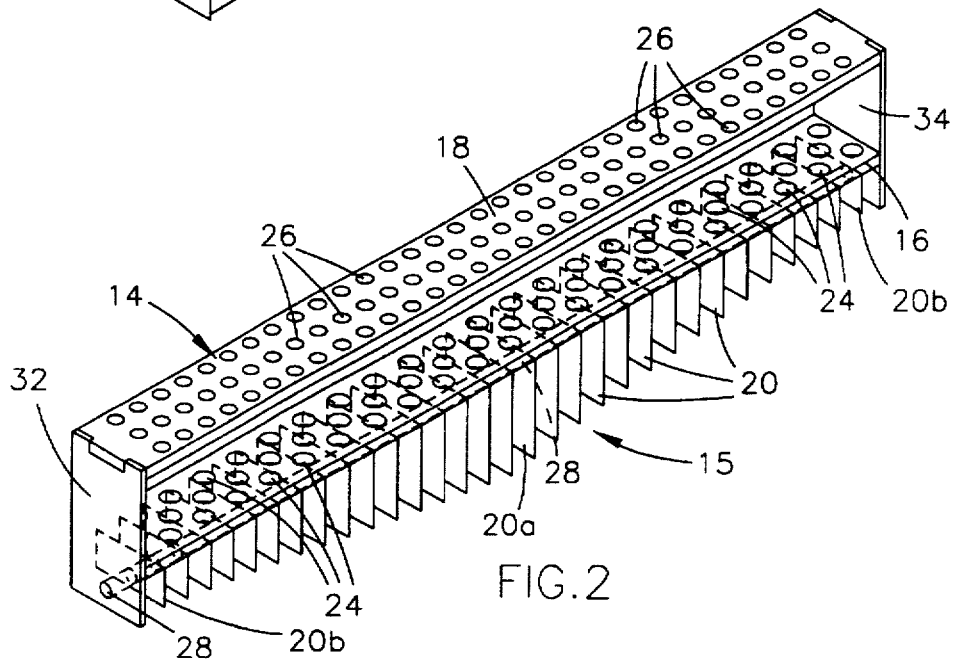

DIRECTIONAL FLOW CONTROL DEVICE FOR A WAVE SOLDERING APPARATUS

FIELD OF THE INVENTION

The present invention generally relates to flow control devices. More particularly, this invention relates to a flow control device adapted to establish a near-parallel flow front from an outlet, and is applicable to flow control of molten solder in a solder application process.

BACKGROUND OF THE INVENTION

Wave soldering is a well-known method by which solder bumps and connections are formed on a circuit board by bringing the circuit board in contact with a "wave" of molten solder flowing upward from a nozzle. Wave soldering methods are typically limited to applying a relatively thin coating of solder, and therefore find widest use for applications in which a solderable contact or lead is to be coated with solder to form a solder fillet or solder connection, respectively. One such example is a circuit component having leads that extend through a circuit board, and to which solder is applied. During wave soldering, the circuit board, placed on a pallet, passes through molten solder coming up from the nozzle, such that the ends of the leads projecting through the circuit board are brought in contact with the upward-flowing molten solder. In the process of adhering to the leads, the solder forms solder connections or fillets.

The flow characteristics of the solder wave are critical to reliably depositing a uniform amount of solder. Therefore, solder flow through the nozzle must be closely controlled to achieve the required reliability, bond integrity and electrical characteristics for the component, while simultaneously eliminating the potential for electrical shorting between adjacent solder connections. While conventional solder wave equipment have achieved high reliability under typical conditions, e.g., where leads do not project more than about ¼ inch (about six millimeters) from the surface of a circuit board, a more difficult application exists where leads project significantly farther, e.g., about 0.5 inch (about 13 millimeters) or more. To accommodate leads of this length, the distance between the circuit board and the solder nozzle must be increased, necessitating that the height of the solder wave also be increased to enable the solder to contact the circuit board. Inherently, such solder wave heights are achieved by higher solder flow velocities from the nozzle. However, in doing so a nonparallel solder wave is generated, such that contact by the solder wave with the circuit board does not have a straight line form, but instead is irregular and possibly discontinuous. As such, a nonparallel solder wave promotes the occurrence of solder shorts, bridges and voids, and therefore a higher circuit board rejection rate.

While the above can be avoided by the use of shorter component leads, this solution is not available for many applications. Therefore, what is needed is a solder wave apparatus that is capable of generating a near-parallel solder wave under flow conditions required to apply molten solder to relatively long component leads of a circuit board. In particular, such a solder wave apparatus must be capable of producing a near-parallel solder wave under flow conditions that yield a solder wave height of at least about 0.5 inch (about 13 millimeters).

SUMMARY OF THE INVENTION

It is an object of this invention to provide a flow control device for a solder wave apparatus.

It is another object of this invention that such a device is adapted to enable the solder wave apparatus to generate a near-parallel solder wave.

It is another object of this invention that such a device is capable of uniformly and reliably applying molten solder to a circuit board having leads that project in excess of one-half inch (about 13 millimeters) from the surface of the board.

In accordance with a preferred embodiment of this invention, these and other objects and advantages are accomplished as follows.

The present invention provides a flow control device for a solder wave apparatus. As is conventional, the solder wave apparatus includes an outlet or nozzle from which molten solder flows in an upward direction to contact the lower surface of a circuit board. The flow control device of this invention provides a screen and baffle that control the flow conditions of molten solder to the nozzle so as to produce a near-parallel solder wave above the nozzle. The screen includes a pair of spaced-apart parallel panels that are disposed upstream of (and therefore beneath) the nozzle. Each of the panels is oriented to be substantially perpendicular to the direction of flow, and each has a number of apertures through which the molten solder flows before entering the nozzle. The apertures of the panels are preferably offset from each other, such that none of the apertures are coaxial but instead overlap each other when superimposed.

The baffle of the flow control device is disposed farther upstream of the screen, and includes a number of fins disposed substantially perpendicular to the panels and substantially parallel to the solder flow through the panels. The fins are arranged in one or more rows, with the lengths of the fins becoming progressively shorter in a direction away from the approximate center of the baffle, such that the two outermost fins are shortest and the innermost fin or fins are longest. The flow control device includes an inlet through which solder flows toward the baffle member, with the fins being substantially perpendicular to the direction of solder flow from the inlet toward the baffle member.

With the configuration described above, the flow control device of this invention is capable of producing a near-parallel solder wave under flow conditions that yield a solder wave height of at least about fifteen millimeters (about ⅝ inch). As such, circuit boards whose leads project a corresponding distance can undergo wave soldering to produce reliable solder connections, as evidenced by the absence of solder shorts, bridges and voids on the circuit board. An additional benefit of the flow control device is that the turbulence of the solder wave is reduced, such that less dross is present in the solder deposited on a circuit board. As a result of these operational advantages of a solder wave apparatus equipped with the flow control device of this invention, lower production rejection rates can be expected. Another advantage is greater processing efficiency as a result of the ability to process on a single process line a variety of circuit boards having lead lengths that differ significantly.

Other objects and advantages of this invention will be better appreciated from the following detailed description.

BRIEF DESCRIPTION OF THE DRAWINGS

The present invention will now be described by way of example, with reference to the accompanying drawings in which:

FIG. 1 is a perspective exploded view of a solder wave apparatus equipped with a flow control device in accordance with a preferred embodiment of the present invention; and FIG. 2 is a perspective view of the flow control device of FIG. 1.

DETAILED DESCRIPTION OF THE INVENTION

Illustrated in FIG. 1 is a solder wave apparatus 10 equipped with a flow control device in accordance with this invention. As is generally conventional, the apparatus 10 includes a trough 22 over which a head 12 is positioned to receive molten solder (not shown) as the solder flows upward through the trough 22. The arrow in FIG. 1 indicates the direction that a circuit board (not shown) travels over the head 12 as solder is being applied. The head 12 includes a nozzle 12a from which the molten solder flows, a front portion 12b over which the solder flows in a forward direction, an exit wing 12c on which solder pools after leaving the nozzle 12a, and a dam 12d that develops the solder wave width. The molten solder contacts the circuit board as the board passes over the wing 12c and dam 12d. The flow of molten solder through the head 12 is generated by a pump (not shown) which is typically mounted in a flow duct 30 upstream of the trough 22. The operating speed and capacity of the pump affect the flow velocity of the solder through the trough 22 and nozzle 12a.

From FIG. 1, those skilled in the art will appreciate that the flow parameters of the molten solder as it flows up through the nozzle 12a and then over the front portion 12b will determine the condition of the solder wave at the dam 12d. Importantly, a near-parallel solder wave is desired above the front portion 12b, enabling leads (not shown) projecting from a circuit board to be uniformly and adequately coated with solder. According to this invention, the flow control device illustrated in FIGS. 1 and 2 achieve the desired near-parallel solder wave, even where leads project 0.5 inch (about thirteen millimeters) or more from a circuit board, a capability not possible in the prior art.

As shown in FIG. 1, the flow control device of this invention includes a screen 14 and baffle 15 which are located upstream and therefore beneath the head 12. The screen 14 and baffle 15 can be formed as a unitary member as shown, though it is foreseeable that other configurations and assembly methods could be used. As also indicated in FIG. 1, the screen 14 and baffle 15 are received within the trough 22, such that molten solder must flow upward through the baffle 15 and then the screen 14, in sequence, prior to exiting the nozzle 12a. The baffle 15 extends down into the flow duct 30 beneath the trough 22, such that the baffle 15 directs the solder flowing through the duct 30 upward through the trough 22 toward the screen 14, while also influencing the distribution of solder along the length of the screen 14.

The screen 14 includes a pair of panels 16 and 18 that are secured between a pair of end plates 32 and 34, such that the panels 16 and 18 are substantially parallel to each other and perpendicular to the direction of solder flow through the trough 22. The lower panel 16 is shown as being adjacent the baffle 15, while the upper panel 18 is nearest the head 12. Each panel 16 and 18 has a number of apertures 24 and 26, respectively, formed therein through which the solder flows. As is apparent from FIG. 1, and as more readily seen in FIG. 2, the apertures 24 in the lower panel 16 are preferably larger than the apertures 26 in the upper panel 18. Though the upper panel 18 is shown as having more apertures 26 than the lower panel 16, the combined area of the apertures 24 of the lower panel 16 is greater than that of the apertures 26 of the upper panel 18, such that the upper panel 18 produces a back pressure in addition to the back pressure created in the trough 22 by the lower panel 16. According to this invention, providing an adequate amount of staged back pressure promotes the attainment of a near-parallel solder wave. A suitable diameter for the apertures 24 is about ten millimeters, and a suitable diameter for the apertures 26 is about six millimeters, though larger or smaller diameters could be used. A suitable area ratio for apertures 24 to apertures 26 is about 1.6:1, though lower or higher ratios could foreseeably be employed as long as the ratio is greater than 1:1.

The apertures 24 and 26 are shown to be coaxially misaligned with each other. This misalignment, in combination with the differences in size and number of the apertures 24 and 26, reduces the tendency for molten solder to have a straight vertical path through the screen 14, thereby promoting the uniformity of the solder wave above the nozzle 12a. Based on the relative size and placement of the apertures 24 and 26, the panels 16 and 18 are preferably spaced apart about 4.5 centimeters in order to achieve suitable flow characteristics through the screen 14, though this distance could vary significantly as a result of other factors, including the baffle 15, aperture size and flow velocity.

The baffle 15 is composed of a number of fins 20 oriented to be substantially parallel to the direction of solder flow through the screen 14. As is most apparent from FIG. 2, the fins 20 are arranged in a single row. As is also apparent from FIG. 2, the fins 20 are immediately adjacent and may abut the lower panel 16. The fins 20 are shown as being mounted on a rod 28 secured to and between the two end plates 32 and 34. For this purpose, the fins 20 are each preferably formed to have a hole in which the rod 28 is received.

With reference again to FIG. 1, the baffle 15 is shown as being oriented such that the row of fins 20 is parallel to the direction of solder flow through the duct 30. As such, the fins 20 are oriented perpendicular to the direction of solder flow within the duct 30, and therefore serve to deflect solder upward through the trough 22 toward the screen 14. According to this invention, the fins 20 are sized such that their lengths become progressively shorter in a direction away from the approximate midpoint of the fin row. As a result, at least one center fin 20a near the midpoint of the fin row is longest while two outer fins 20b located at opposite ends of the row are shortest. In this configuration, the baffle 15 promotes solder flow toward the longitudinal center of the nozzle 12a, yielding a more uniform distribution of solder being channeled toward the screen 14. In a preferred embodiment, the center fin 20a has a length of about three to about four times greater than that of the outer fins 20b, though the relative lengths of the fins 20a and 20b could foreseeably vary. The incremental increase in length between adjacent fins 20 may be constant or vary along the length of the baffle 15.

During the evaluation of this invention, testing was conducted to determine the efficacy of the screen 14 and baffle 15. The solder wave machine employed for the evaluation was an ELECTROVERT ECONOPAK/16 SMT, essentially of the type shown in FIG. 1. Under typical process conditions in which leads project up to about ¼ inch (about six millimeters) below the lower surface of a circuit board, this system is operated at a pump speed of about 1250 rpm and produces a substantially parallel solder wave. However, to achieve a solder wave height sufficient to apply solder to a circuit board whose leads project 0.5 inch (about 13 millimeters) or more, pump speeds of 1800 rpm or more are generally required. The result is a nonparallel solder wave that causes the undesirable results sought to be eliminated by this invention—namely, nonuniform and/or intermittent solder application leading to solder shorts, bridges and voids, as well as flooding of circuit board pallets and the limitation of a single product line per pallet.

Attainment of a parallel solder wave with the ELECTROVERT machine operating at high pump speeds was quantitatively determined through the use of a test board having two electrical contacts that indicate when the lower surface of the board is contacted with molten solder. The contacts were laterally spaced apart on the test board, such that a perfectly straight-line (i.e., parallel) solder wave would contact both contacts simultaneously. When factoring in the speed of the test board as it passes over the solder wave (about two meters per minute) and the infeasibleness of obtaining a perfectly parallel solder wave, it was shown through investigations that a time difference ($\Delta t$) of about 0.40 seconds and less was indicative of a sufficiently parallel solder wave (i.e., a "near-parallel" solder wave) to avoid the results sought to be eliminated by this invention. The time resolution of the test equipment was 0.30 seconds.

Four test configurations were investigated:

(A) With the baffle 15 and screen 14 of this invention;

(B) With the baffle 15 but without the screen 14;

(C) With a prior art baffle and the screen 14; and (D) With the prior art baffle but without the screen 14.

The prior art baffle was equipped with a row of fins similar to that of this invention, but with the fins progressively increasing in length from the end of the baffle nearest the pump to the other farthest from the pump, instead of simultaneously increasing in length from both ends as proposed with the baffle 15 of this invention. All results were obtained with the distance between the nozzle and the lower surface of the test board set at about 0.375 inch (about one centimeter), and a pump speed of about 1800 rpms. The results of six runs for each test configuration were as follows:

| Test Configuration | $\Delta t$ (s) | | |
| --- | --- | --- | --- |
| | Max. | Min. | avg. |
| A | 0.32 | 0.01 | 0.26 |
| B | 0.91 | 0.32 | 0.61 |
| C | 0.62 | 0.31 | 0.43 |
| D | 1.26 | 0.92 | 1.06 |

From the above results, it can be seen that the presence of both the screen 14 and baffle 15 had a significant effect on attainment of a near-parallel solder wave at a high pump speed, while none of the other configurations were able to do so consistently. Notably, Configuration D (prior art baffle without screen 14) never achieved a sufficiently low $\Delta t$ to avoid nonuniform and/or intermittent solder application. The second best results were achieved with Configuration C though, without the baffle 15, two of the six runs yielded readings in excess of 0.4 seconds. From this, it was apparent that the combination of the screen 14 and the baffle 15 produced superior results as compared to that possible with the screen 14 or baffle 15 alone.

Following the above evaluation, the solder wave machine was adjusted to attain a board-to-nozzle distance of about 0.625 inch (about 1.6 centimeters), with results as follows:

Maximum $\Delta t$: 0.32 s

Minimum $\Delta t$: 0.00 s

Average $\Delta t$: 0.21 s

These results showed that the screen 14 and baffle 15 of this invention enabled the solder wave machine to uniformly apply molten solder on circuit boards whose leads project at least 0.625 inch from the circuit board. Finally, the solder wave machine was operated at the more conventional pump speed of 1300 rpm, with the result that the desired near-parallel solder wave was maintained at a correspondingly lower solder wave height. Consequently, another significant advantage of this invention is that circuit boards having different lead lengths can be run on the same solder wave machine at the same time.

While our invention has been described in terms of a preferred embodiment, it is apparent that other forms could be adopted by one skilled in the art. Accordingly, the scope of our invention is to be limited only by the following claims.

The embodiments of the invention in which an exclusive property or privilege is claimed are defined as follows:

1. A flow control device comprising:

outlet means for flowing molten solder therefrom;

a screen member having a pair of spaced-apart parallel panels disposed upstream of the outlet means, each of the panels having apertures through which the solder flows before exiting through the outlet means, each aperture of one of the panels being offset from the apertures of the other panel; and a baffle member disposed upstream of the apertures in the screen member, the baffle member comprising fins disposed substantially perpendicular to each of the panels, the fins being arranged in at least one row with the fins having lengths that become progressively shorter in a direction away from an approximate midpoint of the row.

2. A flow control device as recited in claim 1 wherein the panels comprise a first panel adjacent the outlet means and a second panel adjacent the baffle member.

3. A flow control device as recited in claim 2 wherein the apertures of the second panel are larger than the apertures of the first panel.

4. A flow control device as recited in claim 2 wherein the first panel has more apertures than the second panel.

5. A flow control device as recited in claim 2 wherein the apertures of the second panel have a combined area greater than the combined area of the apertures of the first panel.

6. A flow control device as recited in claim 2 wherein fins located at opposite ends of the row are shortest and at least one fin located at the midpoint of the row is longest.

7. A flow control device as recited in claim 2 wherein the fins of the baffle member abut the second panel.

8. A flow control device as recited in claim 1 further comprising a rod securing the fins of the baffle member to the screen member.

9. A flow control device as recited in claim 1 wherein the fins of the baffle member are substantially perpendicular to a direction of solder flow toward the baffle member.

10. A flow control device as recited in claim 1 wherein the panels are substantially perpendicular to a direction of solder flow through the flow control device.

11. A flow control device for a wave soldering apparatus, the flow control device comprising:

a nozzle having a dam over which molten solder flows during operation of the wave soldering apparatus;

a screen member having a pair of spaced-apart parallel panels disposed beneath and upstream of the nozzle, the panels being substantially perpendicular to a direction of solder flow through the flow control device, each of the panels having at least one row of apertures therein through which the solder flows before encountering the nozzle, each aperture of one of the panels being offset from the apertures of the other panel, a first panel of the panels being disposed adjacent the nozzle and second panel of the panels being disposed beneath the first panel; and a baffle member disposed beneath and upstream of the second panel of the screen member, the baffle member comprising fins disposed adjacent and substantially perpendicular to the second panel, the fins being arranged in a row such that there exist a center fin and two outermost fins at opposite ends of the row, the fins having lengths that become progressively shorter in a direction away from the center fin.

12. A flow control device as recited in claim 11 wherein the fins of the baffle member are substantially perpendicular to a direction of solder flow toward the baffle member.

13. A flow control device as recited in claim 11 wherein the center fin is the longest of the fins and the outermost fins are the shortest of the fins.

14. A flow control device as recited in claim 11 wherein the apertures of the second panel are larger than the apertures of the first panel.

15. A flow control device as recited in claim 11 wherein the first panel has more apertures than the second panel.

16. A flow control device as recited in claim 11 wherein the apertures of the second panel have a combined area greater than the combined area of the apertures of the first panel.

17. A flow control device as recited in claim 11 wherein the fins of the baffle member abut the second panel.

18. A flow control device as recited in claim 11 further comprising a rod securing the fins of the baffle member to the screen member.

19. A flow control device as recited in claim 11 further comprising an inlet through which solder flows toward the baffle member, the fins being substantially perpendicular to a direction of solder flow from the inlet toward the baffle member.

20. A flow control device for a wave soldering apparatus, the flow control device comprising:

a nozzle having a dam over which molten solder flows during operation of the wave soldering apparatus;

a first panel disposed beneath and upstream of the nozzle, the first panel being substantially perpendicular to a direction of solder flow through the flow control device, the first panel having at least two rows of apertures therein through which the solder flows before encountering the nozzle;

a second panel disposed beneath and upstream of the first panel so as to be substantially parallel to the first panel, the second panel having at least two rows of apertures through which the solder flows before encountering the first panel, each aperture of the second panel being offset from the apertures of the first panel, the second panel having larger but fewer apertures than the first panel, the apertures of the second panel have a combined area greater than the combined area of the apertures of the first panel;

a baffle member disposed beneath and upstream of the second panel, the baffle member comprising fins disposed adjacent and substantially perpendicular to the second panel, the fins being arranged in a row such that there exist a center fin and two outermost fins at opposite ends of the row, the fins having lengths that become progressively shorter in a direction away from the center fin such that the center fin is the longest of the fins and the outermost fins are the shortest of the fins; and an inlet through which solder flows toward the baffle member, the fins being substantially perpendicular to a direction of solder flow from the inlet toward the baffle member.

\* \* \* \* \*